United States Patent [19]
Asker et al.

[11] 3,713,281
[45] Jan. 30, 1973

[54] HEAT AND MOISTURE EXCHANGE PACKING

[76] Inventors: Gunnar C. F. Asker; Maurice A. Hubscher, both of 18 Industrial Dr., Flemington, N.J. 08822

[22] Filed: Nov. 2, 1971

[21] Appl. No.: 195,054

[52] U.S. Cl. ..............................................55/387
[51] Int. Cl. ...........................................B01d 53/04
[58] Field of Search.....55/34, 75, 208, 387, 390, 524

[56] References Cited

UNITED STATES PATENTS

| | | | |
|---|---|---|---|
| 3,296,773 | 1/1967 | Hemstreet | 55/208 |
| 2,038,071 | 4/1936 | Wilhelm | 55/524 |
| 3,398,510 | 8/1968 | Pennington | 55/34 |
| 3,070,937 | 1/1963 | Bub | 55/387 |
| 3,020,977 | 2/1962 | Huppke et al. | 55/524 |
| 3,217,715 | 11/1965 | Beger et al. | 55/387 |

Primary Examiner—Charles N. Hart
Attorney—Sol B. Wiczer

[57] ABSTRACT

Gas contacting packing, such as for moisture, heat exchange, catalytic contact and the like, said packing for gas using a metallic foraminous framework for heat or moisture exchange particles while allowing free flow of air thereabout for heat or moisture exchange particles while allowing free flow of air thereabout for optimum surface contact while providing a stable structure, the metallic support having woven wire framework disposed in layers or sheets which may be corrugated and of perforated metal, whereby air may pass both radially and axially in free-flowing contact with the particles.

15 Claims, 9 Drawing Figures

INVENTORS
GUNNAR C. F. ASKER
MAURICE A. HUBSCHER
BY

ATTORNEY

INVENTORS
GUNNAR C. F. ASKER
MAURICE A. HUBSCHER
BY
Sol B. Wiss
ATTORNEY

HEAT AND MOISTURE EXCHANGE PACKING

This application is a continuation of Ser. No. 9,490 filed Feb. 9, 1970, and now abandoned.

This invention relates to a gas contacting packing usually for heat or moisture exchange or for catalytic contact or the like comprising inorganic particles adhered to a foraminous metal support.

More particularly, this packing comprises wire as a woven or netted stranded metal body or perforated metal sheets, preferably disposed in a series of separate, usually concentric, layers, each layer having inorganic heat or moisture exchange particles adhered thereto for large surface exposure of said inorganic particles to gases passed therethrough. The particles merely for heat exchange purposes may be granules or grits or solid heat-resistant inorganic materials and having good heat exchange properties; or they may be formed of highly porous desiccant materials, where moisture may be adsorbed thereto.

For merely heat exchange purposes, the particles may be granules or grits of stone, sand, rock, cement, metal or other preferably heat stable inorganic particulate materials. Such materials as natural sand, quartz, ground limestone, granite, shale or the like, are a useful and most economic source of inorganic particulate materials. However, useful granules may be synthetic such as silicon carbide, alumina, boron carbide or metal particles having good heat conductive properties such as aluminum, copper, zinc, titania, lead, iron or ferrous metal alloys, preferably of a stainless character or catalytically active particles.

Where the particles are to be moisture adsorbent, the very porous synthetics are preferred such as precipitated and dried solid particles of hydrous oxides, for instance, silica gel, alumina gel, magnesium hydroxide, ferrous hydroxide or the like, of which silica and alumina gels are preferred. The particles to be adhered to the metallic screen may be varied in size, ranging from about 3 mm down to about a very fine powdery dust, or in terms of screen size, from about 10 to 200 mesh U. S. Standard Sieve.

The foraminous metal supporting framework may be finely woven, netted or welded wire screen, ranging in mesh size sufficiently larger than the particles adhered thereto and supported thereby to allow free gas passageway between the adhered particles and/or through the interstices provided by the screen, despite the adhesion thereto of particles of the selected size. Such screen may be disposed in layers, with air spaces between layers and which may be horizontally disposed layers, but preferably are concentric annular screen layers. However, the foraminous metal may be sheets, which can be corrugated and secured together in layers either by adhesion or welding.

While it is preferred to adhere particles within the size range stated, the particles can be classified to the total range, i.e., a mixture of very fine with very coarse particles. It is usually preferred to further classify the particles so that they are more homogeneously sized and will not usually vary more than about 50 mesh from the largest to the smallest except in the very fine sizes where particles ranging in size from about 50 through 200 mesh may be intermixed.

The invention is further described with respect to the drawings wherein.

Figure 1:
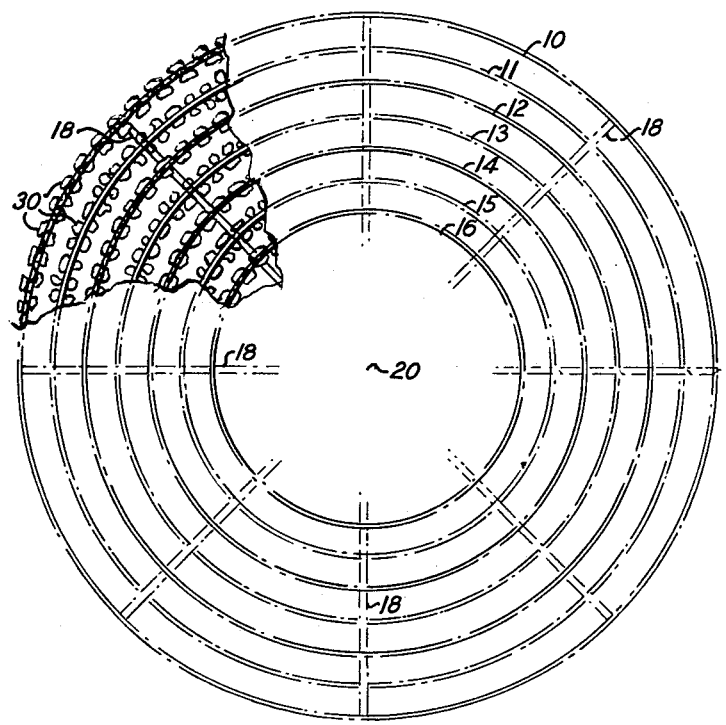
FIG. 1 shows a side elevational view of a round packing.
Figure 2:
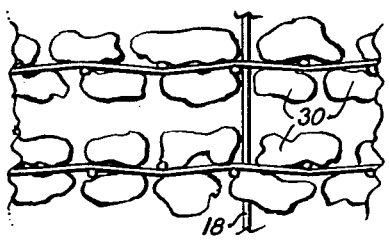
FIG. 2 is an enlarged detail showing in side elevation two adjacent layers forming the packing and secured by radial wire.

As shown in FIG. 1, the packing comprises layers of metal wire screening 10, 11, 12, 13, 14, 15 and 16 disposed radially inward from the periphery toward the center, supported by being integral with or fastened to radial support arms 18, which as shown in FIG. 2, are merely radial wires fastened at the intersection to each layer, as spokes of a wheel for support of each layer. The wheel may have a hub 20 (not shown) allowing rotation and fastening centrally of the radial support arms 18, but such is not necessary since all of the radial arms may be fastened together to form a central axis 20.

Figure 3:
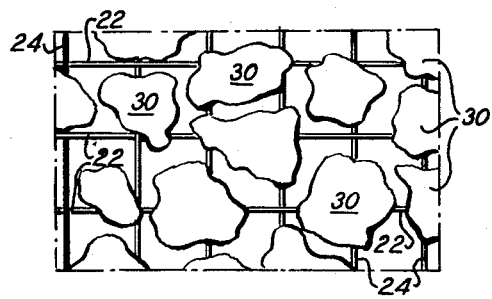
FIG. 3 is a plan view of the edge of the packing of FIG. 1 showing the disposition of solids across a metal screen comprising a layer.

As shown in FIG. 3, each layer comprises parallel wires 22 which are fastened together by cross wires 24 into a screen or wire network. The wire itself will be fine for a very fine, woven or netted wire screen, for supporting fine, such as 50 to 200 mesh, particles; or may be substantially larger gauge wire for support of larger particles. The size of the mesh openings and the size of the wire preferably will roughly correspond to give a sufficiently rigid wire for support of larger particles, firmly supporting the same for free gaseous flow about the particles; and for very fine particles, the wire per se can be of a finer gauge with smaller sized openings. Nevertheless, the wire will be sufficiently rigid to firmly support the same.

Figure 4:
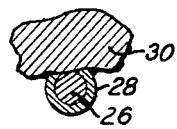
FIG. 4 is a detail showing adhesion of a single particle to a wire strand.

FIG. 4 is a section through one of the wires 26 having a coating of epoxy resin 28 which bonds a particle 30 of heat or moisture transfer material thereto.

Figure 5:
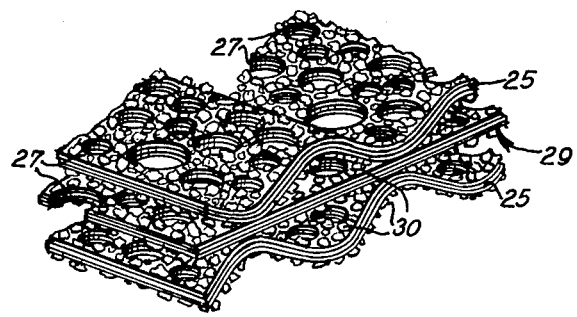
FIG. 5 shows perforated metal sheets corrugated and laminated into a foraminous support.
Figure 6:
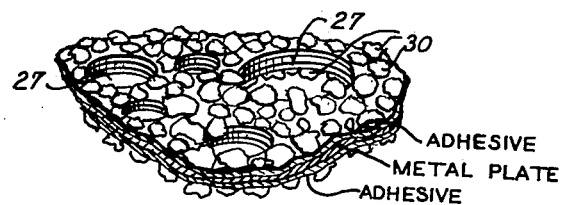
FIG. 6 shows an enlarged detail of the perforated metal sheet of FIG. 5.

As shown in FIGS. 5 and 6, metal sheets 25 such as aluminum or copper, are perforated at 27, and then corru-gated and adhered together into a laminate with or without an intermediate plane sheet 29.

Figure 7:
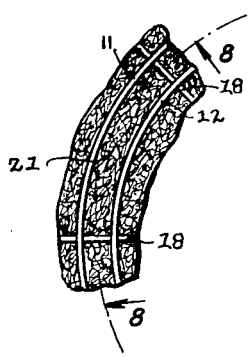
FIG. 7 is directed to a modification in which spaces outlined by the wire network are filled with very fine wire wool, the wire wool consisting of matted thin wires which in turn has fine particles adhered thereto.
Figure 8:
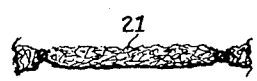
FIG. 8 is an enlarged detail of the wire wool emplacement of FIG. 7 taken between the lines 8 — 8 of FIG. 7.
Figure 9:
FIG. 9 is a highly magnified metal fiber of the wire wool of FIGS. 7 and 8 showing the coating and adhesion thereto of fine particles.

FIG. 7 illustrates in detail a modification in which the wire network comprising outline wires 11 and 12 bonded into sections by cross wires 18, is filled with a total packing of matted wire wool 21. The wire wool is somewhat resilient and will be held in the large wire framework frictionally by inserting a wad of the matted wire wool in each open space enclosed by the larger wire network. The wire wool, however, as shown in FIG. 9 is first dipped in liquid epoxy adhesive and while still tacky is then dusted with fine, 50 to 200 mesh particles of a moisture adsorptive substance such as silica gel.

For purposes of firmly adhering the particles, any adhesive could be used; but it is preferred, as disclosed in our copending application, Ser. No. 768,995, filed Oct. 21, 1968, to use an epoxy resin which not only allows firm bonding and easy handling with controllably fixed setting, but which also itself has good heat exchange properties per se. Thus the polyepoxy resin as described in our parent application can be dried and set as rapidly as desired. It goes through a tacky intermediate phase, whereby particles themselves can be adhered to the metal wire frame therewith, strongly bonded and supported to the metal frame thereby, the inherently good heat transfer properties of the metal frame per se, and the adhered particles per se are not substantially reduced by the good heat exchangive character of this strong bonding material, i.e., the epoxy resin.

Proceeding according to the present invention, the wire or corrugated and perforated sheet metal frame is first dipped in the liquid epoxy resin which is composed of liquid resin having a viscosity low enough to avoid any clogging of the mesh opening of the screen after draining and partially setting. However, it is possible after draining the wet adhesive from the wire frame to spin it in a centrifuge to remove excess adhesive and thus ascertain that all of the mesh spaces between the wires are open. Finally, as the epoxy resin develops a tacky surface in the process of setting, the adhesive coated metal body is coated by dusting with the solid particles which adhere over the entire adhesive-coated surface, but do not clog the mesh openings of the screen.

The wire strands of the frame are arranged in a crosswise pattern either by weaving or netting or welding and the like, to fasten the same into a screen and each screen layer becomes coated with adhesive and particles. It will be understood, even though the drawings show the metallic layers and wires comprising the same in several views to be widely separated, that these will be spaced sufficiently close to form a spaced wire mesh lattice of the heat exchange or moisture adsorptive particles spaced closely together only a practical distance to allow full gas exposure of the suspended or supported particle surfaces, variable somewhat in spacing with the supported particle size, so that one layer is almost contiguous with the next in each direction, three-dimensionally. That support allows sufficient spacing between particles or layers of particles for free passage of gas both radially and, more usually, axially of the cylindrical body, depending upon the ultimate structure of the gas-contacting device intended.

In heat exchange use it would be usual to pass the gas axially in one direction near one side of the cylindrical body to transfer heat to that side. For instance, a heated gas would heat the particles on that side. A cooling gas may simultaneously be passed in the opposite direction near the opposite side of said cylindrical body and, for heat exchange purposes, the body would be rotated slowly to intercept both gas flows for heat exchange. A similar use could be applied for moisture exchange between two gas flows, one to have its moisture adsorbed by the desiccant particles of the packing as the moisture-laden gas passes through the cylindrical body axially of the rotating packing, and another stream of scavenging gas may be passed, usually in opposite direction, to regenerate and drive off the adsorbed moisture usually by being at a substantially higher temperature than the gas from which the moisture was adsorbed.

The following example illustrates the practice of this invention:

EXAMPLE I

A metal screen framework comprising concentric woven wire screens each having the wires separated in one quarter inch intervals thus forming a screen of 16 mesh, the concentric layers each being separated a distance of about one half inch from layer to layer, and secured by radial wiring, is first dipped in a light liquid epoxy resin, typically Shell Epon 834, having an epoxy equivalent of about 250, containing an accelerator. The metal screen is then drained of excess liquid resin. After the liquid coating has become tacky in about 10 minutes, the wet and tacky coated foraminous metal body is then dusted with granular silica gel having a particle size ranging from 25 to 50 mesh, whereby the entire foraminous body is coated with silica gel particles which become firmly set and strongly adhered to the metal framework by the epoxy resin which sets hard. The silica gel supported packing is then used to dry air by rotating it in a moisture laden air stream which impinges between the center and periphery as the annular body is slowly rotated and the air passing over the silica gel particles from side to side becomes dried. The annular body is continuously regenerated by passing a second stream of scavenging air similarly through a diametrically opposite side of the rotating body, the scavenging gas, however, being heated to a temperature of about 250°F whereby the adsorbed moisture in the adhered silica gel particles is driven off.

EXAMPLE II

The formation of the structure described in Example I is repeated, except that hard aluminum oxide grits having a particle size in the range of 50 to 75 mesh are similarly adhered to the metallic screen foraminous body. In this case the grits may be used merely as heat exchangive particles so that gases each at different temperatures may be passed through diametrically opposite portions of the annular body to exchange heat between them as the body rotates, the warmer gas giving up heat to the exchanger body while the cooler gas absorbs heat.

EXAMPLE III

Following the procedure of Example I, particulate coatings such as silica gel are adhered to a corrugated and perforated foraminous metallic sheet body as shown in FIG. 5. The gases are passed from one side of the body to the next, flowing through the corrugations and passing radially through the sheets by way of the perforations from one corrugated layer to the next. Such packing is similarly useful to dry the gas.

EXAMPLE IV

A metal screen framework comprising concentric woven wire screens having the wires separated a relatively large distance, such as from one half to 1 inch, has the cubical spaces defined thereby filled with a coated steel wire wool. The wire wool is first dipped in a liquid epoxy resin and drained of the excess liquid. In about ten minutes after the coating has become tacky, the wool is then thoroughly dusted with dry granular silica gel having a mesh size ranging from about 75 to 125 so that silica gel particles become firmly embedded in and coated upon the tacky wire wool fibrils. The thus coated wire wool, before a firm set is imparted thereto by the epoxy, is packed into the wire spaces as shown in FIG. 7, where it is retained frictionally but is highly porous to allow easy passage of air through the fibers. Hence, the wadded and coated wire wad, as thus mounted in the wire framework, is highly porous and air may be passed over the particles of silica gel thus held bonded to the surfaces of the fibrils. The metal frame, as described in Example I, may be rotated as air is passed through the wire wool and thus over the silica gel particles to become dried. In the same way, the annular body may be regenerated by passing a stream of scavenging air over the silica gel as described in Example I.

As thus described, various solid particulate substances may be adhered to a foraminous metal framework comprising layers of woven wire or perforated metal sheets, the latter being separated as corrugations between layers, whereby the gas may flow freely both axially and radially of the body for optimum contact with the particulate substances. Various metallic and inorganic heat exchangive and moisture adsorbent substances as listed above may be adhered to the metal framework. These are selected primarily for their function. For instance, as solid particles or grits with metal, metal oxides, salts or finely ground rock or cementitious bodies as listed above and having good heat transfer properties may be used, as well as metal particles. Where the fine particles are intended to adsorb moisture, then they are selected to have a desiccant character and will be porous for that purpose. It is possible, of course, for other contact purposes that the particles have a catalytic effect, or a selective adsorptive effect, whereby inorganic catalytic particulate bodies including molecular sieves may be adhered to the foraminous metal framework for optimum exposure to gaseous flow.

What is claimed is:

1. Fluid contacting packing comprising a foraminous metal body comprising an open metal framework having multiple supporting layers disposed three-dimensionally in said framework forming a porous lattice of vertically and horizontally laminated layers allowing easy fluid flow therethrough in all directions, said framework having an adhesive coating over substantially the entire metallic surface exposed body thereof, fine solid particles separately distributed upon and bonded only by the exposed surface of said adhesive, said particles being granularly shaped to provide fluid permeability through interstices therebetween in bonded position upon said metal framework, said particles being selected to affect the physical or chemical substance of the fluid such as its moisture, heat exchangive or catalytic activated condition, whereby such particles are firmly and separately supported in the framework space for optimum surface contact with fluid passed in contact therewith.

2. The foraminous metal body as defined in claim 1 wherein the layers comprise layers of wire screening.

3. The foraminous metal body as defined in claim 1 wherein the packing comprises a netting of wire disposed as a framework defining a plurality of spaces bounded by said wire to comprise a body that is highly air permeable.

4. The foraminous metal body as defined in claim 1 wherein the metal layers of wire enclose spaces which are filled with wire wool frictionally retained therein, said wire wool fibrils being coated with said fine particles.

5. The foraminous metal body as defined in claim 1 wherein the metal layers comprise perforated corrugated metallic sheets.

6. The foraminous metal body as defined in claim 1 wherein the particles are adhered to said foraminous metal body by an epoxy resin coated on said metal framework and bonding said particles by adhesive contact of its outer surface thereto.

7. The foraminous metal body as defined in claim 1 wherein the particles are of inorganic substance having high heat exchangive properties.

8. The foraminous metal body as defined in claim 1 wherein the particles are porous inorganic substance and are moisture adsorbent.

9. The foraminous metal body as defined in claim 7 wherein the particles are hard inorganic oxides and silicates.

10. The foraminous metal body as defined in claim 8 wherein the particles are a porous hydrous oxide.

11. The foraminous metal body as defined in claim 8 wherein the particles are a porous hydrous oxide of the group consisting of alumina and silica gels.

12. The structure as defined in claim 1 wherein the metal lattice of said body has granular solids adhered upon the exposed adhesive surfaces.

13. The structure as defined in claim 1 wherein the metal lattice of said body has granular desiccant solids adhered upon the exposed adhesive surfaces.

14. The structure as defined in claim 1 wherein the metal lattice of said body has granular catalyst solids adhered upon the exposed adhesive surfaces.

15. Heat exchange and fluid treatment packing as defined in claim 1 wherein the adhesive adheres molecular sieves.

* * * * *